United States Patent [19]

Eckland et al.

[11] Patent Number: 4,915,590
[45] Date of Patent: Apr. 10, 1990

[54] WIND TURBINE BLADE ATTACHMENT METHODS

[75] Inventors: John E. Eckland; James V. Frerotte, both of Tracy, Calif.

[73] Assignee: Fayette Manufacturing Corporation, Tracy, Calif.

[21] Appl. No.: 88,670

[22] Filed: Aug. 24, 1987

[51] Int. Cl.⁴ .................................................. F01D 5/30
[52] U.S. Cl. ................................ 416/225; 416/229 R; 29/889.21; 403/267
[58] Field of Search ................... 416/204 R, 207, 225, 416/226, 229 R, 229 A, 239, 248; 29/156.8 H, 156.8 B, 452; 403/260, 266, 267, 343

[56] References Cited

U.S. PATENT DOCUMENTS

| | | | |
|---|---|---|---|
| 2,919,889 | 1/1960 | Rubel | 416/225 X |
| 3,216,162 | 11/1965 | Gerber et al. | 29/452 X |
| 3,559,275 | 2/1971 | Slater | 416/225 X |
| 3,695,780 | 10/1972 | Velkoff | 416/225 X |
| 3,741,681 | 6/1973 | De Witt | 416/225 X |
| 4,281,943 | 8/1981 | Viennot | 403/267 |
| 4,360,288 | 11/1982 | Rutledge et al. | 403/267 X |
| 4,589,176 | 5/1986 | Rosman et al. | 416/229 A X |
| 4,602,892 | 7/1986 | Brookstein et al. | 403/343 X |

FOREIGN PATENT DOCUMENTS

| | | | |
|---|---|---|---|
| 2102803 | 2/1979 | Fed. Rep. of Germany | 416/225 |
| 869554 | 2/1942 | France | 416/226 |

Primary Examiner—Robert E. Garrett
Assistant Examiner—Joseph M. Pitko
Attorney, Agent, or Firm—Bruce & McCoy

[57] ABSTRACT

A rotor blade for a horizontal axis wind turbine wherein a multiplicity of sucker rods are utilized internally of the blade root for securing the blade to the rotating hub of the turbine including the method of attaching the blade root to the hub and the method of making the blade root.

10 Claims, 3 Drawing Sheets

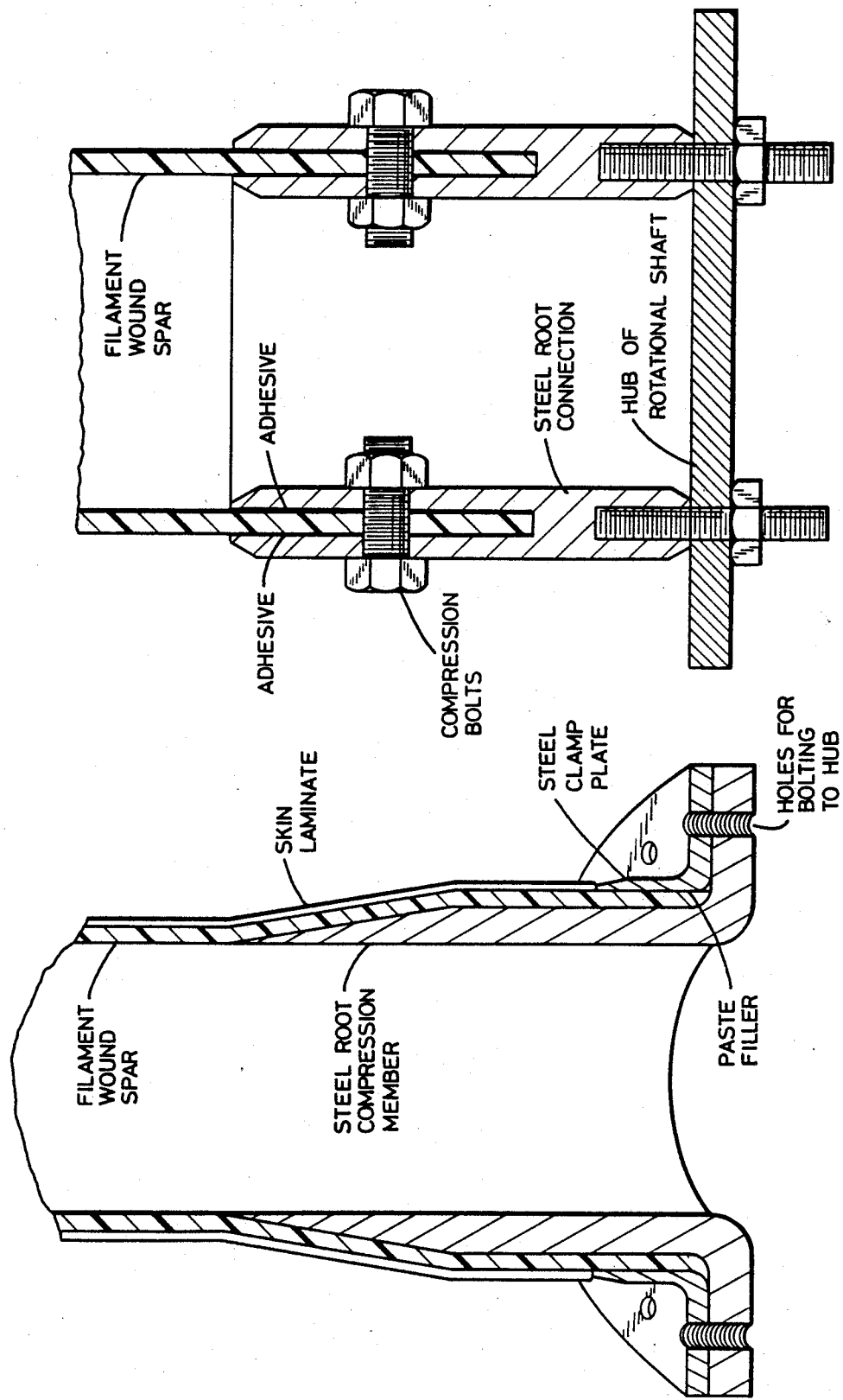
FIG._1. (PRIOR ART)
FIG._2. (PRIOR ART)

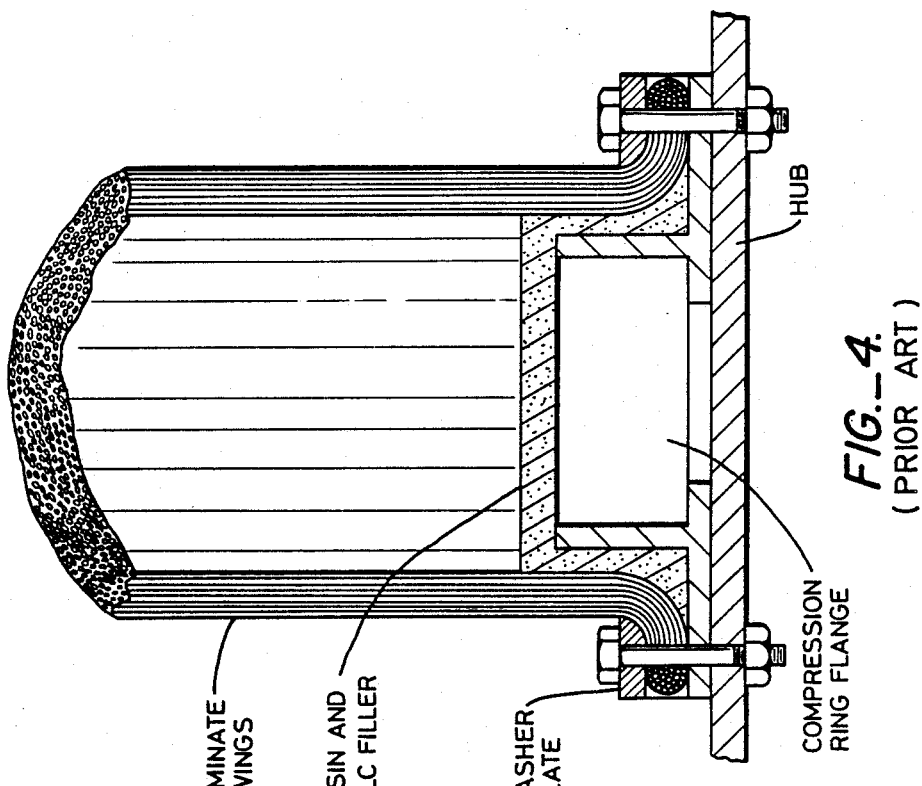
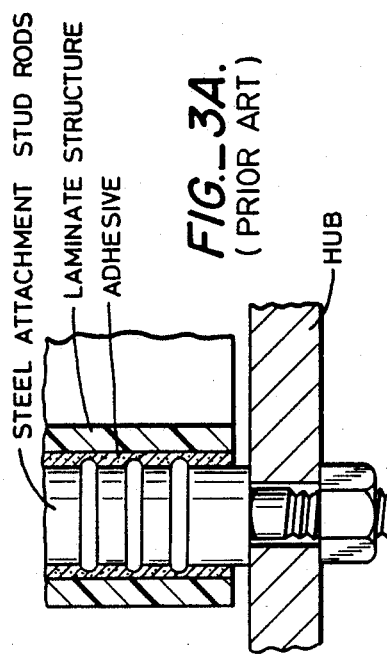
FIG._3A.
(PRIOR ART)
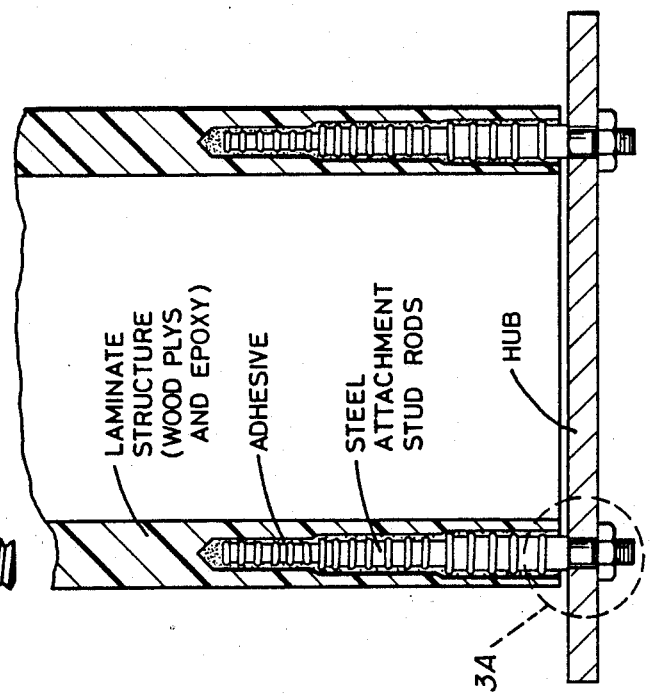
FIG._3.
(PRIOR ART)
FIG._4.
(PRIOR ART)

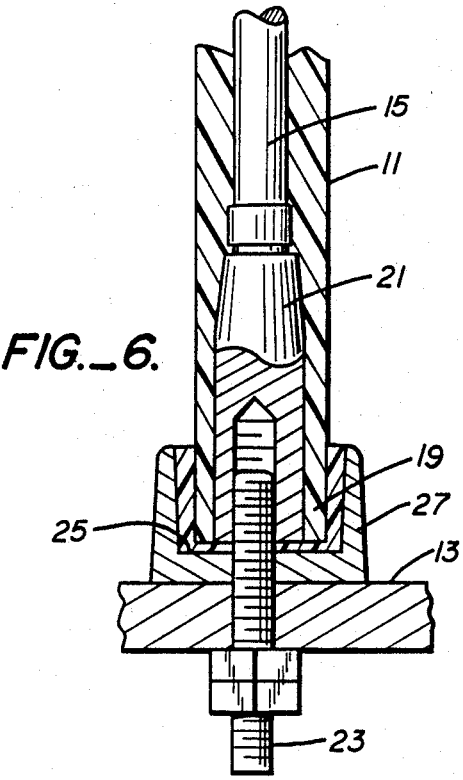
FIG._6.
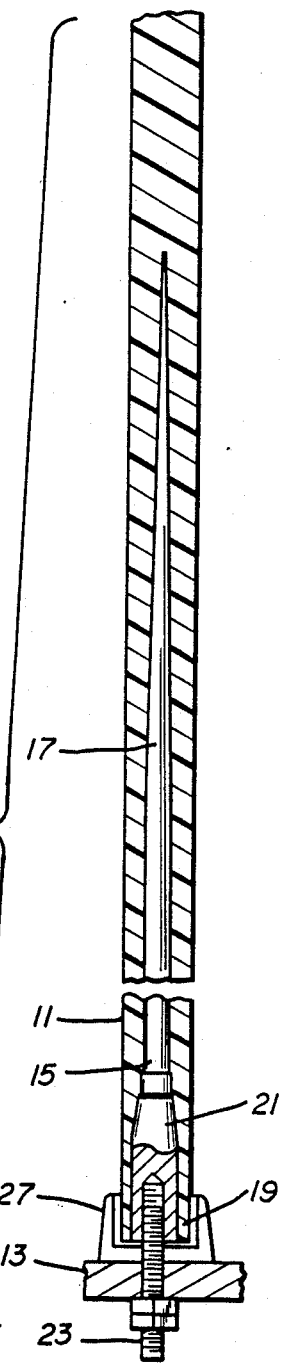
FIG._7.
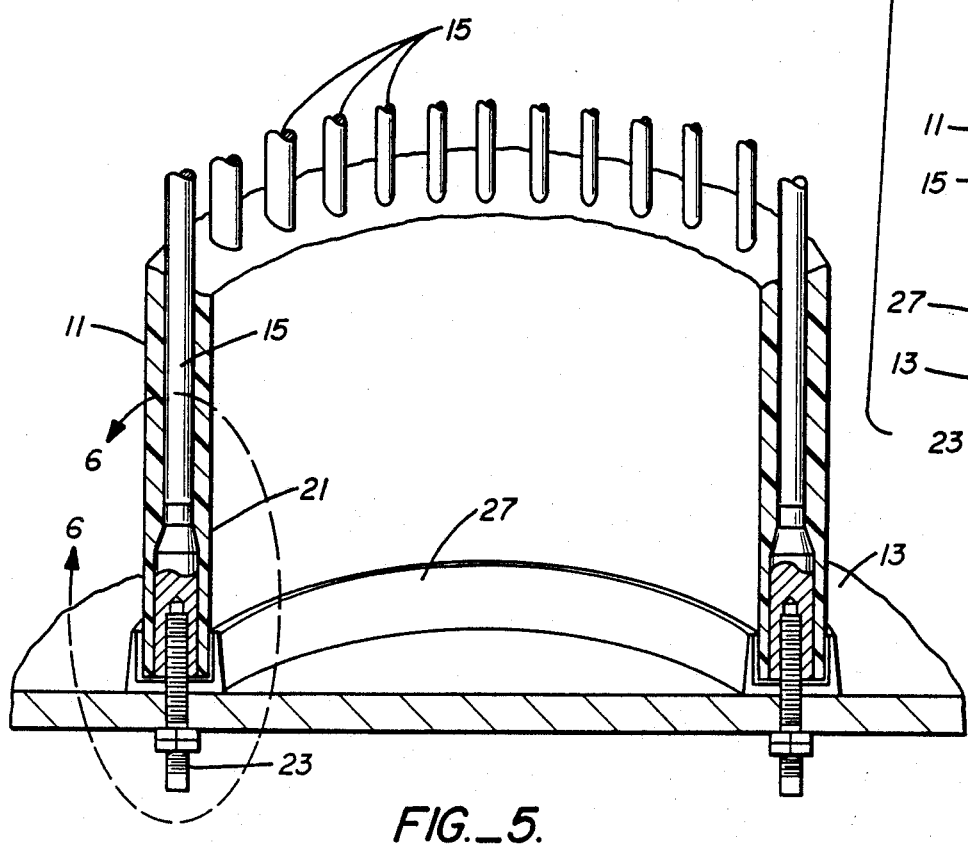
FIG._5.

WIND TURBINE BLADE ATTACHMENT METHODS

BACKGROUND OF THE INVENTION

1. Field of the Invention

The present invention relates to rotor blades for wind turbines and, more particularly, to the attachment means for securing a rotor blade root to the hub of the rotating shaft of a horizontal axis wind turbine and to the method for attaching it and the method for manufacturing the blade.

2. Description of the Prior Art

Wind turbines have been used for many years to harness the power of the wind as a source of energy. In recent years, with the use of ever larger rotor blades on wind turbines, an operational problem has been recognized which is fatigue failure of the blades at the point of attachment of the blade root to the hub of the rotational shaft of the turbine. Most wind turbine rotors rotate many millions of times per year and thus accumulate a large number of cycles of stresses. In order to avoid the damaging effects of high cycle fatigue on the wind turbine blade root, and its supporting structure, it is necessary to control the stress on the blade/hub connection.

Structural failure due to cyclic stress fatigue of the turbine blade roots is believed to be due to stress loading of dissimilar materials at the attachment point of the blade root. Wind turbine rotor blades are usually very large and made of composite materials such as fiberglass and wood/epoxy while the hub of the rotational shaft of the wind turbine is usually constructed of steel. These rotor blades are considerably different than an aircraft propeller which is a complicated high rotational speed wind pushing mechanical device with internal mechanisms for changing the pitch of the blade in response to operator control. A wind turbine rotor blade on the other hand is a very long slow rotational speed blade pushed by the wind to harness the wind energy. There are very few common features between propellers and wind turbine blades in their construction except for a general similarity in appearance in some designs.

In operation, the bending loads which are imposed on a turbine blade by gravity, wind, and other forces are translated at the blade root/hub interface into tension, compression, and shear loads. By far the largest loads are those occurring in tension and compression when the individual blade is horizontal and wind loaded.

Various devices and methods have been used in the prior art to attach rotor blades to the rotational shafts of wind turbines. Most of these embody the use of a metal or combination metal and composite material flange on the root of the blade that is bolted to the hub of the rotational shaft by steel rods or bolts, or they insert steel bolts or rods into the composite blade structure.

FIG. 1 of the drawings shows one example of a blade attachment means where the filament-wound spar and skin laminant of the root of the blade are bound around a steel root compression member and held thereagainst by an overlay steel clamp plate.

FIG. 2 shows a different steel root connection having the filament-wound spar laminant of the root of the blade secured internally in the connection in a cylindrical male-female relation. Compression bolts and adhesive hold the laminant in the steel foot connector which in turn is bolted to the rotation hub of the wind turbine.

FIG. 3 shows a rotor blade root laminant structure of woodply and epoxy which has steel attachment stud rods secured internally of the blade root by an epoxy adhesive and which project from the bottom of the blade root. The stud rods are in turn bolted to the steel hub of the rotation shaft of the turbine.

FIG. 4 shows yet another blade root connector utilizing a compression ring flange which is bolted to the hub of the turbine. The laminant rovings of the rotor blade root are flared around the compression ring flange and held thereto by a washer plate. The washer plates are held in place by bolts which project through the whole sandwich assembly: the washers, the laminant, and the compression ring flange to hold the blade root to the hub of the rotational shaft of the turbine.

These methods of attachment all experience and are subject to the major problem of cyclic fatigue stress. In methods which employ inserting the laminated composite blade structure into a metal flange or connector, examples of which are shown in FIGS. 1, 2, and 4, the interface are creates massive stress risers in the composite material at the metal hub interface which can lead to fatigue failures as these joints are experiencing alternating cycles of tension and compression.

In designs utilizing a flange of composite laminate and then clamping that composite flange to the rotational hub, such as are illustrated by the example of FIG. 3, the loads on the blade are converted into alternating bending stresses in the composite hub. These materials which are well-constructed for tension and compression loads are not well-suited for bending loads and also fail in fatigue. The worse possible loading cycle, that of alternating compression and tension, as well as bending, is also present at this bend in the composite material.

The third method which has been used to attach the blade to the shaft, as shown in FIG. 3, which involves embedding a steel rod into the composite material and then using this rod to take all the compression and tension loads, also has problems in fatigue; primarily because of the sharply different physical characteristics of the two materials in the presence of alternating compression and tension loads. Their rates of thermal expansion are radically different as are their modulus in compression and tension. Over time, with tens of millions of cycles of fatigue loading, these differences cause problems with the adhesive bonds. Also, bending and flexing of the blade under load causes stress in the composite shell itself where these rods are embedded which also can lead to fatigue failure.

All of the above methods are used to attach blades to the hubs of rotational shafts of wind turbines and each of them provides some period of useful life. However, all of them fail at some point measured in tens of millions of cycles. Thus, there is a need for a rotor blade root connection method which will last for hundreds of millions of cycles.

SUMMARY OF THE INVENTION

The present invention is a new and novel rotor blade for a wind turbine having a formed blade portion and a blade root. The root is formed for attachment to the hub of the rotational shaft of the turbine. The blade root includes at least one sucker rod secured internally thereof disposed for securement to the hub. The sucker rod is unbonded to the blade root for a substantial portion of its length. This structure arrangement forms a free end of the sucker rod at the root end and a secured end at the formed blade portion end. The sucker rod is formed so that it can be placed in tension when it is secured to the hub of the rotational shaft.

In the preferred embodiment, a multiplicity of sucker rods are disposed around the periphery of the hub end of the blade and the free ends are disposed in a formed pattern placing them approximately equidistant from their connections to the rotational shaft of the turbine when the rotor blade is disposed in operative position with respect thereto.

The present invention also contemplates a new and novel method for attaching a rotor blade of a wind turbine to the hub of the rotational shaft thereof. The method involves providing a multiplicity of sucker rods disposed internally around the periphery of the hub end or root of the rotor blade where it attaches to the hub. Only a portion of the length of the sucker rods are bonded to the blade root with the ends of the sucker rod which attach to the hub of the shaft and a substantial portion of the length of the sucker rods adjacent to those free or root ends being unbonded to the rotor blade. The sucker rods are secured to the hub of the shaft in tension, whereby the portion of the blade root surrounding the sucker rods is disposed against the shaft in compression with the degree of tension imposed on the sucker rods being such that they remain in tension throughout the rotational cycle of the blade.

The present invention further contemplates the method for making a wind turbine blade having a blade root which is secured to the hub of the rotational shaft of the turbine. The method comprises embedding a multiplicity of sucker rods internally around the periphery of said blade root parallel to the axis of the blade and coating a substantial length of the sucker rod from the hub end with a releasing agent. The remaining length of the sucker rods is then bonded internally to the blade root whereby the root ends of the sucker rods are approximately equal length free ends floating in the root of the blade.

OBJECTS OF THE INVENTION

It is therefore an important object of the present invention to provide a new and novel rotor blade for a wind turbine which does not utilize dissimilar materials at the blade root to effect attachment of the rotor blade to the hub of the rotational shaft of the turbine.

It is another object of the present invention to provide a new and novel method for attaching a rotor blade of a wind turbine to the hub of the rotational shaft thereof.

It is a further object of the present invention to provide a new and novel method for making a wind turbine rotor blade having a blade root which is secured to a rotational shaft of a wind turbine.

It is yet another object of the present invention to provide a method for lessening the fatigue stress on the attachments of rotor blades to the rotational shaft of horizontal axis wind turbines.

It is yet a further object of the present invention to provide a method for eliminating the alternating compression/tension load on a rotor blade root while simultaneously reducing the amplitude of a cycle load on the blade attachment connections.

It is still another object of the present invention to provide a method for making a rotor blade which eliminates the problems associated with the use of dissimilar materials in the laminated composite.

And it is still a further object of the present invention to provide attachment connectors which maintain compression on the blade root of a wind turbine rotor blade throughout the rotational cycle of the blade.

Other objects of the present invention will become apparent when the specification of the preferred embodiment is considered in conjunction with the accompanying drawings.

BRIEF DESCRIPTION OF THE DRAWINGS

FIG. 1 is a side elevation in cross-section of a first prior art blade root/hub attachment design;

FIG. 2 is a side elevation in cross-section of a second prior art blade root/hub attachment design;

FIG. 3 is a side elevation in cross-section of a third prior art blade root/hub attachment design;

FIG. 3A is a broken out section taken from FIG. 3;

FIG. 4 is a side elevation in cross-section of a fourth prior art blade root/hub attachment design;

FIG. 5 is a side elevation in cross-section of the preferred embodiment of the present invention;

FIG. 6 is a broken-out portion of the present invention showing a side elevation of the attachment connection in cross-section; and FIG. 7 is a side elevation in cross-section of the sucker rod of the present invention bonded to the blade.

DESCRIPTION OF THE PREFERRED EMBODIMENT

The present invention is a rotor blade for a horizontal axis wind turbine having a formed airfoil blade portion (not shown) and a blade root 11 (illustrated in FIG. 5) for attachment to the hub 13 of the rotational shaft of the turbine. The blade includes in the preferred embodiment a multiplicity of sucker rods 15 spaced around the periphery of the rotor blade root and secured internally thereto. It is obvious that the rods could be spaced at regular intervals in the blade root. However, a more specific pattern with the rods concentrated in the areas of higher stress, on the high and low sides of the blade, may be more desirable for economy and strength and depending on the cross-section design of the blade root.

In the preferred embodiment, the rods 15 extend radially parallel to the axial length of the blade and are positioned or disposed for securement to the hub of the rotational shaft. The blade roots are relatively straight in most designs whereby the sucker rods are preferably aligned parallel the axis of the blade but they could be angled with respect thereto in a tapered or solid blade root. The sucker rods, as used in the present invention, are more fully disclosed in U.S. Pat. No. 4,360,288, issued Nov. 23, 1982, to Woodrow T. Rutledge, Jr., et al., for a FIBERGLASS SUCKER ROD CONSTRUCTION.

In the preferred embodiment of the present invention, the sucker rods 15 are disposed in the root of the rotor blade 11 with a substantial unbonded length. In the proportions found satisfactory for the present purpose, they are unbonded to the rotor blade at the root end thereof for approximately 85% of the length of the sucker rod extending outward from the hub toward the blade portion. They are tapered down in diameter toward the secured end in the bonded area 17 where he rod is mated internally to the blade. This design arrangement forms free ends of the sucker rods 19 at the blade root or hub end, and a secured end of the sucker rod at the other or outboard formed blade portion end.

The free ends 19 of the sucker rods are formed so that they can be placed in tension when they are secured to the hub 13 of the turbine. In the preferred embodiment, the sucker rods are provided with an adapter 21 which is secured to the rod and receives a bolt 23 so that the sucker rod can be bolted directly to the hub of the rotational shaft. The sucker rods are formed shorter in length at the root end than the adjacent surrounding structure of the rotor blade root which forms the abutting surface 25 which contacts the hub whereby the free end of the sucker rod is recessed in the rotor blade root a finite distance. As a result, the sucker rods are disposed around the periphery of the rotor blade rort, and the free ends of the rods are disposed in a formed pattern placing them approximately equidistant from the surface of the hub of the rotational shaft of the turbine when the rotor blade is disposed in operative position with respect thereto. This means that if the hub of the rotational shaft is curved or cylindrical, the connection adapter or contact interface or abutting surface of the blade root must be concave and the free ends of the sucker rods will be arranged in a curved or cylindrical plane parallel the contact interface of the blade root. In other words, the sucker rods are recessed an equal amount from the adjacent blade root abutting surface which contacts the rotational hub.

When the rotor blade 11 is secured to the turbine shaft hub 13, it is fitted into an adapted ring 27 which is formed to abut the hub surface and receive the blade root. A filler material is utilized to fill the space between the rotor blade outer surfaces and the adapter ring inner surface.

The abutting end of the blade root which fits in the adapter ring is protected and prvented from splintering or mushing inward and outward when it is forced in compression against the abutting surface of the adapter ring. This occurs when the sucker rods are tightened against the hub. As the sucker rods are tightened, they elongate incrementally along their unbonded length. It has been found that as little as only 5% of the sucker rod needs to be bonded to the blade in the size proportions needed to achieve the desired tension. This tension varies of course with the number of sucker rods utiized and the weight and size of the rotor blades. The tension required in the rods is that which wil keep all of the abutting surface of the blade root constantly in compression throughout all operating conditions of the wind rotor. Obviously, if the blade root experiences any other condition than compression it will simply become loose in the adapter ring with no load on that portion of the root interface and would most likely result in a failure; possibly catastrophic. Thus, the tension load imposed on the sucker rods includes a safety factor to prevent unloading.

The present invention also contemplates a new and novel method for attaching a rotor blade of a wind turbine to the hub of the rotational shaft thereof. The method comprises providing a multiplicity of sucker rods disposed internally around the periphery of the root of the blade where it attaches to the hub. The process includes bonding only a portion of the length of the end of the sucker rods to the blade with the end of the sucker rod which attaches to the shaft hub and a substantial portion of the length of the sucker rod adjacent to said end being unbonded to the blade.

The sucker rods which are provided around the periphery of the blade root are disposed in a formed pattern and recessed therein during bonding so that the ends which attach to the hub are recessed in the blade root equidistant from the surface of the adjacent end of the blade root which contacts the hub. The sucker rods are secured to the hub of the shaft in tension whereby the root portion of the blade surrounding the sucker rod is disposed against the hub in compression. The degree of preload tension which is imposed on the sucker rods is such that they remain in tension throughout the rotational cycle of the blade.

The magnitude of stress on the sucker rod increases only slightly as the rod elongates and the preload on the composite structure relaxes. The exact magnitude of variation of stress seen by each part (the sucker rod or the blade root composite structure) is a function of the wind load, preload, and the area, length, and modulus of each. This arrangement removes the high amplitude cyclic compression and tension loads from the blade/hub interface, and its fasteners, to farther out in the blade root where they can be absorbed in a properly designed composite structure. The loads at the blade root/hub interface are divided into nearly constant loads of tension in the sucker rods and compression in the blade root composite structure contact with the steel hub. Depending upon material and size selection, the tension/compression loads and the length of bonding can be varied.

The present invention also contemplates a new and novel method for making a wind turbine rotor blade having a blade root which is secured to the hub of the rotational shaft of the turbine. The method comprises embedding a multiplicity of sucker rods internally around the periphery of the blade root parallel to the axis of the blade. The sucker rods are coated for a substantial length from the root end with a releasing agent. The remaining length of the sucker rod is bonded internally to the root of the blade whereby the root ends of the sucker rods are approximately equal length free floating ends for longitudinal incremental movement in the root of the blade. Equal length means that they are disposed in a formed pattern around the axis of the blade with the root ends recessed approximately equidistant from the surface of the adjacent end of the blade root which contacts the hub. During the bonding process, a substantial length of the rod is coated with releasing agent to prevent it from bonding to the blade root except at the securement end out toward the formed blade portion.

Thus, the present invention provides a method for eliminating the alternating compression/tension cycle load of the prior art while simultaneously reducing the amplitude of the cyclic load on the blade attachment connections. The invention also eliminates the problems associated with the use of dissimilar materials in the connectors or inducing bending loads into the laminated composite as occurs in the prior art devices. This preferred method creates a blade root composite structure which abuts and bears directly against the metal hub structure. All compression loads are taken directly by the laminated composite without any bending moments being induced into the blade root by the connection to the hub.

The sucker rod or tension connector is fabricated from similar or identical composite to the blade structure and thus has similar coefficients of thermal expansion and contraction and very similar modules in compression and tension. The adapter which connects the sucker rod to the metal hub has been proven over many years of cycle life in the oil industry for tension-tension cyclic fatigue loads.

Thus, it will be seen from the foregoing description of the preferred embodiment of the present invention that all of the objects and advantages claimed herein have been attained. While the apparatus of the present invention is described in considerable detail, many modifications and improvements should be obvious to one skilled in the art. Therefore, the scope of the invention is not to be limited to the details as set forth herein except as may be necessitated by the appended claims.

We claim:

1. A rotor blade for a wind turbine having a formed blade portion and a blade root, said root being formed for attachment to the hub of the rotational shaft of the turbine, said blade root including at least one sucker rod secured internally thereof and disposed for securement to said hub, said sucker rod being unbonded to said blade root for a substantial portion of the length thereof forming a free end of said sucker rod of the root end and a secured end at the formed blade portion end, said sucker rod being formed shorter in length at the root end than said rotor blade root whereby the free end of the sucker rod is recessed in the surrounding structure of the root of said rotor blade so that it can be placed in tension when it is secured to said hub.

2. The rotor blade of claim 1 wherein a multiplicity of sucker rods are disposed around the periphery of the root of said rotor blade and their free ends are disposed in a formed pattern placing them approximately equidistant from their connections to the hub of the turbine when the rotor blade is disposed in operative position with respect thereto.

3. The rotor blade of claim 1 wherein at least 75% of the length of the sucker rod is unbonded to said rotor blade internally whereby the unbonded portion is free to move in the blade root when it is elongated in tension during attachment to the rotor hub.

4. A rotor blade for a wind turbine having a formed airfoil blade portion for reacting to wind energy and a blade root for attachment to the hub of the rotational shaft of said turbine, said blade root including a multiplicity of sucker rods spaced around and secured internally thereof extending generally parallel to the axial length of said blade and disposed for securement to said hub, said sucker rods being unbonded to said blade root for at least 75% of the length thereof forming free ends of said sucker rods at the root ends and secured ends at the formed blade ends, said sucker rods being formed shorter in length at the root end than said adjacent blade root whereby the free ends of the sucker rods are recessed in the rotor blade roots approximately equidistant from the surface of the hub of the turbine when the rotor blade is disposed in operative position with respect thereto.

5. A method for attaching a rotor blade of a wind turbine to the hub of the rotational shaft thereof comprising providing a multiplicity of sucker rods disposed internally around the periphery of the hub end or root of said blade where it attaches to said hub, said sucker rods being formed to engage said hub bonding only a portion of the length of the end of said sucker rods to said blade with the root end of the sucker rod which attaches to said hub and a substantial portion of the length of the sucker rod adjacent to said root end being unbonded to said blade, and securing said sucker rods to said shaft in tension whereby the root of said blade surrounding said sucker rods is disposed against said shaft in compression, the degree of tension imposed on said sucker rods being such that they remain in tension throughout the rotational cycle of said blade.

6. The method of claim 5 wherein the sucker rods which are provided around the periphery of the root of said blade are disposed in a formed pattern and recessed therein whereby the ends of the sucker rods which attach the hub are recessed in the blade root an equal amount from the adjacent blade root abutting surface which contacts the hub.

7. A method for attaching a rotor blade of a wind turbine to the hub of the rotational shaft thereof comprising providing a multiplicity of sucker rods disposed internally around the periphery of the hub end or root of said blade where it attaches to said hub, said sucker rods being formed to engage said hub bonding only a portion of the length of the end of said sucker rods to said blade with the root end of the sucker rod which attaches to said hub and a substantial portion of the length of the sucker rod adjacent to said root end being unbonded to said blade, said sucker rods which are provided around the periphery of the root of said blade being disposed in a formed pattern and recessed therein whereby the ends which attach to the hub are recessed in the blade root equidistant from the adjacent blade root abutting surface which contacts the hub, and securing said sucker rods to said shaft in tension whereby the abutting surface of the root of said blade surrounding said sucker rods is disposed against said shaft in compression, the degree of tension imposed on said sucker rods being such that they remain in tension throughout the rotational cycle of said blade.

8. A method for making a wind turbine rotor blade having a blade root which is secured to the hub of the rotational shaft of the turbine comprising embedding a multiplicity of sucker rods internally around the periphery of said blade root generally parallel the axis of said blade, coating a substantial length of the sucker rod from the root end with a releasing agent, and bonding the remaining length of the sucker rod internally to said blade root whereby the root ends of said sucker rods are approximately equal length free ends floating in the root of said blade.

9. The method of claim 8 wherein the sucker rods are disposed in a formed pattern around the axis of the blade root with the root ends recessed in the blade root approximately an equal amount from the adjacent blade root abutting surface which contacts the rotational hub of the turbine.

10. The method of making a wind turbine rotor blade having a blade root which is secured to a rotational shaft comprising embedding a multiplicity of sucker rods internally around the periphery of the root of said blade generally parallel the axis of said blade in a formed pattern with the root ends of the sucker rods recessed in the blade root approximately an equal amount from the adjacent blade root abutting surface which contacts the hub of the rotational shaft of the turbine, coating a predetermined length of the sucker rods from the root ends thereof with a releasing agent, and bonding the remaining length of the sucker rods internally to said blade root whereby the root ends of said sucker rods are free floating in the blade root.

* * * * *